US008469820B2

(12) United States Patent
Nathan et al.

(10) Patent No.: US 8,469,820 B2
(45) Date of Patent: *Jun. 25, 2013

(54) COMMUNICATION DEVICE AND METHOD BETWEEN AN AUDIOVISUAL INFORMATION PLAYBACK SYSTEM AND AN ELECTRONIC GAME MACHINE

(75) Inventors: Guy Nathan, Nun's Island (CA); Tony Mastronardi, Pierrefonds (CA); Alain Choquet, Montreal (CA)

(73) Assignee: TouchTunes Music Corporation, New York, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/801,119

(22) Filed: May 24, 2010

(65) Prior Publication Data
US 2010/0279775 A1 Nov. 4, 2010

Related U.S. Application Data

(63) Continuation of application No. 10/845,147, filed on May 14, 2004, now Pat. No. 7,749,083, which is a continuation of application No. 09/686,405, filed on Oct. 12, 2000, now Pat. No. 6,755,744.

(30) Foreign Application Priority Data

Jun. 29, 2000 (FR) .................................. 00 08397
Sep. 18, 2000 (FR) .................................. 00 11978

(51) Int. Cl.
*A63F 9/24* (2006.01)
(52) U.S. Cl.
USPC .............................................. 463/42; 463/25
(58) Field of Classification Search
USPC 463/35, 41, 25, 42; 705/26–27; 709/218–219
See application file for complete search history.

(56) References Cited

U.S. PATENT DOCUMENTS

| 3,807,541 A | 4/1974 | Kortenhaus |
| 3,982,620 A | 9/1976 | Kortenhaus |

(Continued)

FOREIGN PATENT DOCUMENTS

| AU | 199954012 | 4/2000 |
| DE | 34 06 058 | 8/1985 |

(Continued)

OTHER PUBLICATIONS

Patent Astract of Japan vol. 95, No. 010 & JP 07 281682 A (Naguo Yuasa), 27 Oct. 1 JP 07 281682, figure 1-6 abrége.

(Continued)

*Primary Examiner* — Masud Ahmed
(74) *Attorney, Agent, or Firm* — Nixon & Vanderhye PC

(57) ABSTRACT

The invention relates to a communication device between an audiovisual information playback system (1) and at least one electronic game machine (2), each electronic game machine comprising a viewing means (200), a means (210) for interacting with the user and a means of payment (220), characterized in that each electronic game machine (2) is connected to the playback system (2) via a network interface (21) and an associated LAN (3), and comprises specific means (20, 21, 22) for managing a means of payment, a viewing means and an interactive means, in order to enable, on the electronic game machine (2), the selection and payment of at least one selection stored on the playback system (2), with a view to playback thereof on the playback system, the specific means (22) of managing payment means and the specific means (21) of managing viewing means and the interactive means being triggered by the activation means of the electronic game machine (2).

12 Claims, 2 Drawing Sheets

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,704,804 A | 11/1987 | Wyatt |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A | 8/1994 | Frank |
| 5,355,302 A | 10/1994 | Martin |
| 5,357,276 A | 10/1994 | Banker |
| 5,369,778 A | 11/1994 | Sansoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |

| | | | | | |
|---|---|---|---|---|---|
| 5,555,244 A | 9/1996 | Gupta | 5,790,172 A | 8/1998 | Imanaka |
| 5,557,541 A | 9/1996 | Schulhof | 5,790,671 A | 8/1998 | Cooper |
| 5,557,724 A | 9/1996 | Sampat et al. | 5,790,856 A | 8/1998 | Lillich |
| 5,559,505 A | 9/1996 | McNair | 5,793,364 A | 8/1998 | Bolanos et al. |
| 5,559,549 A | 9/1996 | Hendricks | 5,793,980 A | 8/1998 | Glaser |
| 5,561,709 A | 10/1996 | Remillard | 5,798,785 A | 8/1998 | Hendricks |
| 5,565,908 A | 10/1996 | Ahmad | 5,802,283 A | 9/1998 | Grady et al. |
| 5,566,237 A | 10/1996 | Dobbs | 5,802,599 A | 9/1998 | Cabrera |
| 5,570,363 A | 10/1996 | Holm | 5,805,804 A | 9/1998 | Laursen et al. |
| 5,578,999 A | 11/1996 | Matsuzawa et al. | 5,808,224 A | 9/1998 | Kato |
| 5,579,404 A | 11/1996 | Fielder et al. | 5,809,246 A | 9/1998 | Goldman |
| 5,583,561 A | 12/1996 | Baker et al. | 5,812,643 A | 9/1998 | Schelberg et al. |
| 5,583,937 A | 12/1996 | Ullrich et al. | 5,815,146 A | 9/1998 | Youden et al. |
| 5,583,994 A | 12/1996 | Rangan | 5,825,884 A | 10/1998 | Zdepski et al. |
| 5,583,995 A | 12/1996 | Gardner et al. | 5,831,555 A | 11/1998 | Yu et al. |
| 5,592,482 A | 1/1997 | Abraham | 5,831,663 A | 11/1998 | Waterhouse et al. |
| 5,592,551 A | 1/1997 | Lett | 5,832,024 A | 11/1998 | Schotz et al. |
| 5,592,611 A | 1/1997 | Midgely et al. | 5,832,287 A | 11/1998 | Atalla |
| 5,594,509 A | 1/1997 | Florin | 5,835,843 A | 11/1998 | Haddad |
| 5,596,702 A | 1/1997 | Stucka et al. | 5,842,869 A | 12/1998 | McGregor et al. |
| 5,612,581 A | 3/1997 | Kageyama | 5,845,104 A | 12/1998 | Rao |
| 5,613,909 A | 3/1997 | Stelovsky | 5,845,256 A | 12/1998 | Pescitelli et al. |
| 5,616,876 A | 4/1997 | Cluts | 5,848,398 A | 12/1998 | Martin et al. |
| 5,617,565 A | 4/1997 | Augenbraun et al. | 5,851,149 A | 12/1998 | Xidos et al. |
| 5,619,247 A | 4/1997 | Russo | 5,854,887 A | 12/1998 | Kindell |
| 5,619,249 A | 4/1997 | Billock et al. | 5,857,020 A | 1/1999 | Peterson |
| 5,619,250 A | 4/1997 | McClellan et al. | 5,857,707 A | 1/1999 | Devlin |
| 5,619,698 A | 4/1997 | Lillich | 5,862,324 A | 1/1999 | Collins |
| 5,623,666 A | 4/1997 | Pike | 5,864,811 A | 1/1999 | Tran et al. |
| 5,631,693 A | 5/1997 | Wunderlich et al. | 5,864,868 A | 1/1999 | Contois |
| 5,636,276 A | 6/1997 | Brugger | 5,864,870 A | 1/1999 | Guck |
| 5,638,426 A | 6/1997 | Lewis | 5,867,714 A | 2/1999 | Todd |
| 5,642,337 A | 6/1997 | Oskay | 5,870,721 A | 2/1999 | Norris |
| 5,644,714 A | 7/1997 | Kikinis | 5,880,386 A | 3/1999 | Wachi et al. |
| 5,644,766 A | 7/1997 | Coy | 5,880,769 A | 3/1999 | Nemirofsky et al. |
| 5,654,714 A | 8/1997 | Takahashi et al. | 5,884,028 A | 3/1999 | Kindell |
| 5,659,466 A | 8/1997 | Norris et al. | 5,884,298 A | 3/1999 | Smith |
| 5,661,517 A | 8/1997 | Budow et al. | 5,887,193 A | 3/1999 | Takahashi |
| 5,661,802 A | 8/1997 | Nilssen | 5,896,094 A | 4/1999 | Narisada et al. |
| 5,663,756 A | 9/1997 | Blahut et al. | 5,903,266 A | 5/1999 | Berstis et al. |
| 5,668,592 A | 9/1997 | Spaulding | 5,913,040 A | 6/1999 | Rakavy |
| 5,668,778 A | 9/1997 | Quazi | 5,914,712 A | 6/1999 | Sartain et al. |
| 5,668,788 A | 9/1997 | Allison | 5,915,094 A | 6/1999 | Kouloheris |
| 5,675,734 A | 10/1997 | Hair | 5,915,238 A | 6/1999 | Tjaden |
| 5,680,533 A | 10/1997 | Yamato et al. | 5,917,537 A | 6/1999 | Lightfoot |
| 5,684,716 A | 11/1997 | Freeman | 5,917,835 A | 6/1999 | Barrett |
| 5,689,641 A | 11/1997 | Ludwig et al. | 5,918,213 A | 6/1999 | Bernard et al. |
| 5,691,778 A | 11/1997 | Song | 5,920,700 A | 7/1999 | Gordon et al. |
| 5,691,964 A | 11/1997 | Niederlein et al. | 5,923,885 A | 7/1999 | Johnson |
| 5,696,914 A | 12/1997 | Nahaboo et al. | 5,926,531 A | 7/1999 | Petite |
| 5,697,844 A | 12/1997 | Von Kohorn | 5,930,765 A | 7/1999 | Martin |
| 5,703,795 A | 12/1997 | Mankovitz | 5,931,908 A | 8/1999 | Gerba |
| 5,708,811 A | 1/1998 | Arendt | 5,933,090 A | 8/1999 | Christenson |
| 5,712,976 A | 1/1998 | Falcon | 5,940,504 A | 8/1999 | Griswold |
| 5,713,024 A | 1/1998 | Halladay | 5,949,411 A | 9/1999 | Doerr et al. |
| 5,715,416 A | 2/1998 | Baker | 5,949,688 A | 9/1999 | Montoya |
| 5,717,452 A | 2/1998 | Janin et al. | 5,953,429 A | 9/1999 | Wakai et al. |
| 5,721,583 A | 2/1998 | Harada et al. | 5,956,716 A | 9/1999 | Kenner et al. |
| 5,721,815 A | 2/1998 | Ottesen et al. | 5,959,869 A | 9/1999 | Miller |
| 5,721,829 A | 2/1998 | Dunn et al. | 5,959,945 A | 9/1999 | Kleiman |
| 5,724,525 A | 3/1998 | Beyers et al. | 5,963,916 A | 10/1999 | Kaplan |
| 5,726,909 A | 3/1998 | Krikorian | 5,966,495 A | 10/1999 | Takahashi |
| 5,734,719 A | 3/1998 | Tsevdos | 5,978,855 A | 11/1999 | Metz |
| 5,734,961 A | 3/1998 | Castille | 5,978,912 A | 11/1999 | Rakavy et al. |
| 5,739,451 A | 4/1998 | Winksy et al. | 5,980,261 A | 11/1999 | Mino et al. |
| 5,743,745 A | 4/1998 | Reintjes | 5,999,499 A | 12/1999 | Pines et al. |
| 5,745,391 A | 4/1998 | Topor | 5,999,624 A | 12/1999 | Hopkins |
| 5,748,254 A | 5/1998 | Harrison et al. | 6,002,720 A | 12/1999 | Yurt |
| 5,748,468 A | 5/1998 | Notenboom et al. | 6,005,599 A | 12/1999 | Asai et al. |
| 5,751,336 A | 5/1998 | Aggarwal et al. | 6,008,735 A | 12/1999 | Chiloyan et al. |
| 5,757,936 A | 5/1998 | Lee | 6,009,274 A | 12/1999 | Fletcher |
| 5,758,340 A | 5/1998 | Nail | 6,011,758 A | 1/2000 | Dockes et al. |
| 5,761,655 A | 6/1998 | Hoffman | 6,018,337 A | 1/2000 | Peters |
| 5,762,552 A | 6/1998 | Vuong | 6,018,726 A | 1/2000 | Tsumura |
| 5,774,527 A | 6/1998 | Handelman et al. | 6,025,868 A | 2/2000 | Russo |
| 5,774,668 A | 6/1998 | Choquier | 6,034,925 A | 3/2000 | Wehmeyer |
| 5,774,672 A | 6/1998 | Funahashi | 6,038,591 A | 3/2000 | Wolfe et al. |
| 5,781,889 A | 7/1998 | Martin | 6,040,829 A | 3/2000 | Croy et al. |
| 5,786,784 A | 7/1998 | Gaudichon | 6,041,354 A | 3/2000 | Biliris et al. |

| | | |
|---|---|---|
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |

| | | | |
|---|---|---|---|
| 2003/0093790 A1 | 5/2003 | Logan et al. | |
| 2003/0101450 A1 | 5/2003 | Davidsson et al. | |
| 2003/0104865 A1 | 6/2003 | Itkis et al. | |
| 2003/0108164 A1 | 6/2003 | Laurin et al. | |
| 2003/0135424 A1 | 7/2003 | Davis et al. | |
| 2003/0208586 A1 | 11/2003 | Mastronardi et al. | |
| 2003/0225834 A1 | 12/2003 | Lee et al. | |
| 2004/0025185 A1 | 2/2004 | Goci et al. | |
| 2004/0085334 A1 | 5/2004 | Reaney | |
| 2004/0103150 A1 | 5/2004 | Ogdon et al. | |
| 2004/0204220 A1 | 10/2004 | Fried et al. | |
| 2004/0205171 A1 | 10/2004 | Nathan et al. | |
| 2004/0220926 A1 | 11/2004 | Lamkin et al. | |
| 2005/0060405 A1 | 3/2005 | Nathan et al. | |
| 2005/0073782 A1 | 4/2005 | Nathan | |
| 2005/0086172 A1 | 4/2005 | Stefik | |
| 2005/0125833 A1 | 6/2005 | Nathan et al. | |
| 2005/0267819 A1 | 12/2005 | Kaplan | |
| 2006/0018208 A1 | 1/2006 | Nathan et al. | |
| 2006/0035707 A1 | 2/2006 | Nguyen et al. | |
| 2006/0062094 A1 | 3/2006 | Nathan et al. | |
| 2006/0239131 A1 | 10/2006 | Nathan et al. | |
| 2006/0293773 A1 | 12/2006 | Nathan et al. | |
| 2007/0121430 A1 | 5/2007 | Nathan | |
| 2007/0142022 A1 | 6/2007 | Madonna et al. | |
| 2007/0160224 A1 | 7/2007 | Nathan | |
| 2007/0204263 A1 | 8/2007 | Nathan et al. | |
| 2007/0209053 A1 | 9/2007 | Nathan | |
| 2007/0247979 A1 | 10/2007 | Brillon et al. | |
| 2008/0069545 A1 | 3/2008 | Nathan et al. | |
| 2008/0077962 A1 | 3/2008 | Nathan | |
| 2008/0086379 A1 | 4/2008 | Dion et al. | |
| 2008/0096659 A1 | 4/2008 | Kreloff et al. | |
| 2008/0137849 A1 | 6/2008 | Nathan | |
| 2008/0168807 A1 | 7/2008 | Dion et al. | |
| 2008/0171594 A1 | 7/2008 | Fedesna et al. | |
| 2008/0195443 A1 | 8/2008 | Nathan et al. | |
| 2008/0239887 A1 | 10/2008 | Tooker et al. | |
| 2009/0037969 A1 | 2/2009 | Nathan et al. | |
| 2009/0070341 A1 | 3/2009 | Mastronardi et al. | |
| 2009/0138111 A1 | 5/2009 | Mastronardi | |
| 2009/0265734 A1 | 10/2009 | Dion et al. | |
| 2009/0282491 A1 | 11/2009 | Nathan | |
| 2010/0042505 A1 | 2/2010 | Straus | |
| 2010/0211818 A1 | 8/2010 | Nathan et al. | |
| 2010/0241259 A1 | 9/2010 | Nathan | |
| 2010/0269066 A1 | 10/2010 | Nathan et al. | |

FOREIGN PATENT DOCUMENTS

| | | | |
|---|---|---|---|
| DE | 3723737 A1 | 1/1988 | |
| DE | 3820835 A | 1/1989 | |
| DE | 3820835 A1 | 1/1989 | |
| DE | 3815071 | 11/1989 | |
| DE | 4244198 | 6/1994 | |
| DE | 19610739 | 9/1997 | |
| DE | 19904007 | 8/2000 | |
| EP | 0082077 A | 6/1983 | |
| EP | 0140593 A2 | 5/1985 | |
| EP | 0256921 | 2/1988 | |
| EP | 0283304 | 9/1988 | |
| EP | 0283350 A | 9/1988 | |
| EP | 0309298 | 3/1989 | |
| EP | 0313359 A | 4/1989 | |
| EP | 0340787 | 11/1989 | |
| EP | 0363186 | 4/1990 | |
| EP | 0 425 168 A | 5/1991 | |
| EP | 0464562 A2 | 1/1992 | |
| EP | 0480558 | 4/1992 | |
| EP | 0498130 | 8/1992 | |
| EP | 0498130 A2 | 8/1992 | |
| EP | 0 507 110 | 10/1992 | |
| EP | 0529834 | 3/1993 | |
| EP | 0538319 B1 | 4/1993 | |
| EP | 0631283 A | 12/1994 | |
| EP | 0632371 | 1/1995 | |
| EP | 0711076 | 5/1996 | |
| EP | 0786122 B1 | 7/1997 | |
| EP | 0817103 | 1/1998 | |
| EP | 0841616 A2 | 5/1998 | |
| EP | 0919964 | 6/1999 | |
| EP | 0959570 A1 | 11/1999 | |
| EP | 0974896 A1 | 1/2000 | |
| EP | 0974941 | 1/2000 | |
| EP | 0982695 | 3/2000 | |
| EP | 1001391 | 5/2000 | |
| EP | 1408427 | 4/2004 | |
| FR | 2602352 A | 2/1988 | |
| FR | 2808906 | 11/2001 | |
| GB | 2122799 A | 1/1984 | |
| GB | 2166328 A | 4/1986 | |
| GB | 2170943 | 8/1986 | |
| GB | 2193420 | 2/1988 | |
| GB | 2 238680 A | 6/1991 | |
| GB | 2 254 469 | 10/1992 | |
| GB | 2259398 | 3/1993 | |
| GB | 2262170 A | 6/1993 | |
| GB | 2380377 | 4/2003 | |
| JP | 57-173207 | 10/1982 | |
| JP | 58-179892 | 10/1983 | |
| JP | 60-253082 | 12/1985 | |
| JP | 61084143 | 4/1986 | |
| JP | 62-192849 | 8/1987 | |
| JP | 62-284496 | 12/1987 | |
| JP | 63-60634 | 3/1988 | |
| JP | 2-153665 | 6/1990 | |
| JP | 5-74078 | 3/1993 | |
| JP | 5122282 | 5/1993 | |
| JP | 07281682 | 10/1995 | |
| JP | 08-279235 | 10/1996 | |
| JP | 8274812 | 10/1996 | |
| JP | 10-098344 | 4/1998 | |
| WO | WO 86/01326 A | 2/1986 | |
| WO | WO 90/07843 A | 7/1990 | |
| WO | WO 91/08542 | 6/1991 | |
| WO | WO 91/20082 A | 12/1991 | |
| WO | WO 93/16557 | 8/1993 | |
| WO | WO 93/18465 A | 9/1993 | |
| WO | WO 94/03894 A | 2/1994 | |
| WO | WO 94/14273 | 6/1994 | |
| WO | WO 94/15306 | 7/1994 | |
| WO | WO 94/15416 A | 7/1994 | |
| WO | WO 95/03609 A | 2/1995 | |
| WO | WO 95/29537 | 11/1995 | |
| WO | WO 96/12255 | 4/1996 | |
| WO | WO 96/12256 | 4/1996 | |
| WO | WO 96/12257 | 4/1996 | |
| WO | WO 96/12258 A | 4/1996 | |
| WO | WO 98/07940 | 2/1998 | |
| WO | WO 98/45835 | 10/1998 | |
| WO | WO 01/00290 | 1/2001 | |
| WO | WO 01/08148 | 2/2001 | |
| WO | WO 02/095752 | 11/2002 | |
| WO | WO 2006/014739 | 2/2006 | |

OTHER PUBLICATIONS

Bonczck, Robert H. et al., "The DSS Development System," 1983 National Computer Conference, Anaheim, California, May 16-19, 1983, pp. 441-455.

IBM Tehnical Disclosure Bulletin, vol. 30, No. 5, Oct. 1987, "Method for Automated Assembly of Software Versions," pp. 353-355.

"Robotic Wafer Handling System for Class 10 Environments" IBM Technical Disclosure Bulletin, vol. 32, No. 9A, Feb. 1990, pp. 141-143.

"High-speed Opens and Shorts Substrate Tester," IBM Technical Disclosure Bulletin, vol. 33, No. 12, May 1991, pp. 251-259.

"Darts Revolution Again," Replay Magazine, Mar. 1991, pp. 146-148.

Galen A. Grimes, "Chapter 18. Taking Advantage of Web-based Audio."

Petri Koskelainem, "Report on Streamworks™".

W. Richard Stevens, "TCP/IP Illustrated: vol. 1, the Protocols".

Nowell Outlaw "Virtual Servers Offer Performance Benefits for Networking Imaging".

"Ecast Forges Landmark International Technology Partnership", Business Wire at www.findarticles.com/cf_0/m0EIN/2000_July_25/63663604/print.jhtml, 2 pages, Jul. 25, 2000.

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Derfler et al., "How Networks Work", Millennium Ed., Que Corporation, Jan. 2000.

European Search Report from EP 1 993 079.

European Search Report issued for European Application No. 08000845.1-1238/1962251, dated Apr. 3, 2009.

Gralla, "How the Internet Works", Millennium Ed., Que Corporation, Aug. 1999.

Hicks et al., "Dynamic software updating", ACM PLDI, pp. 13-23, 2001.

iTOUCH 27 New Games brochure, JVL Corporation, 2005, 2 pages.

iTouch 8 Plus brochure, JVL Corporation, 2005, 2 pages.

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.

Look and iTouch brochure, JVL Corporation, 2004, 2 pages.

Megatouch Champ brochure, Merit Industries, Inc., 2005, 2 pages.

Melnik et al., "A mediation infrastructure for digital library services", ACM DL, pp. 123-132, 2000.

Mod Box Internet brochure, Merit Entertainment, 2006, 2 pages.

Newsome et al., "Proxy compilation of dynamically loaded java classes with MoJo", ACM LCTES, pp. 204-212, 2002.

Schneier, "Applied Cryptography", Second Edition, John Wiley & Sons, Inc. New York, 1996.

Vortex Brochure, JVL Corporation, 2005, 2 pages.

Waingrow, "Unix Hints & Hacks", Que Corporation, Indianapolis, IN, 1999.

White, "How Computers Work", Millennium Ed., Que Corporation, Indianapolis, IN, Sep. 1999 (Sep. 22, 1999).

COMMUNICATION DEVICE AND METHOD BETWEEN AN AUDIOVISUAL INFORMATION PLAYBACK SYSTEM AND AN ELECTRONIC GAME MACHINE

This application is a continuation of U.S. application Ser. No. 10/845,147, filed May 14, 2004 now U.S. Pat. No. 7,749,083, which is a continuation of U.S. application Ser. No. 09/686,405, filed Oct. 12, 2000 now U.S. Pat. No. 6,755,744, and claims priority to FR 00 08397, filed Jun. 29, 2000, and FR 00 11978, filed Sep. 18, 2000, the entire contents of each of which are hereby incorporated by reference.

FIELD OF THE INVENTION

The invention relates to a communication device and method between an audiovisual information playback system and at least one electronic game machine.

BACKGROUND OF THE INVENTION

In the prior art, an audiovisual information playback system is known, in particular from the European patents EP 786 212, and EP 786 122 filed by the applicant. This system mainly comprises a selection means and a playback means enabling a user to choose a musical selection that will be played back by the system.

Also, electronic game machines based on a microprocessor System are known. These machines have no connection interface and cannot be used as terminals of a playback system, and the jukebox cannot be used for collecting data from the machines.

OBJECT AND SUMMARY OF THE INVENTION

It is therefore an object of the invention to compensate for the drawbacks of the prior art by proposing a communication device allowing game machines to be used as terminals for the playback system.

This object is achieved by a communication device between an audiovisual information playback system and at least one electronic game machine, each electronic game machine comprising a viewing means, a means for interacting with the user and a means of payment, characterized in that each electronic game machine is connected to the playback system via a network interface and associated LAN and comprises a specific means for handling the means of payment, the viewing means and the interactive means, to enable, at the electronic game machine, the selection and payment of at least one selection stored on the playback system with a view to playback thereof on the playback system, the specific means 22 of managing means of payment and the specific means 21 of managing viewing means and interactive means, being triggered by activation means for the electronic game machine 2.

Another object is that of proposing a communication method allowing game machines to be used as terminals for the playback system.

This second object is achieved by a communication method between an audiovisual information playback system and at least one electronic game machine, each electronic game machine comprising a viewing means, a means for interacting with the user and a means of payment, the playback system being connected to each electronic game machine via a LAN, characterized in that the method comprises:

a step of activating specific management means of an electronic game machine to change the original operating mode of the electronic game machine into a mode implementing the following steps:

a step of setting up a connection between the playback system and the electronic game machine;

a step 303, 304 of transferring graphical dialog screens, from the playback system to the electronic game machine 2, prompting a user to choose a musical selection or to trigger a payment step;

a step 308 of choosing a musical selection;

a step 315 of paying for the chosen selection a step of playing back, by means of the playback to system 1, the selection made.

BRIEF DESCRIPTION OF DRAWINGS

The invention, together with its features and advantages, will be more apparent from reading the description provided with references to the appended drawings, where.

DESCRIPTION OF THE PREFERRED EMBODIMENTS

As explained above, the invention relates to a communication device between an audiovisual information playback system, hereafter called a jukebox, with the aim of simplification, and at least one electronic game machine.

Figure 1:
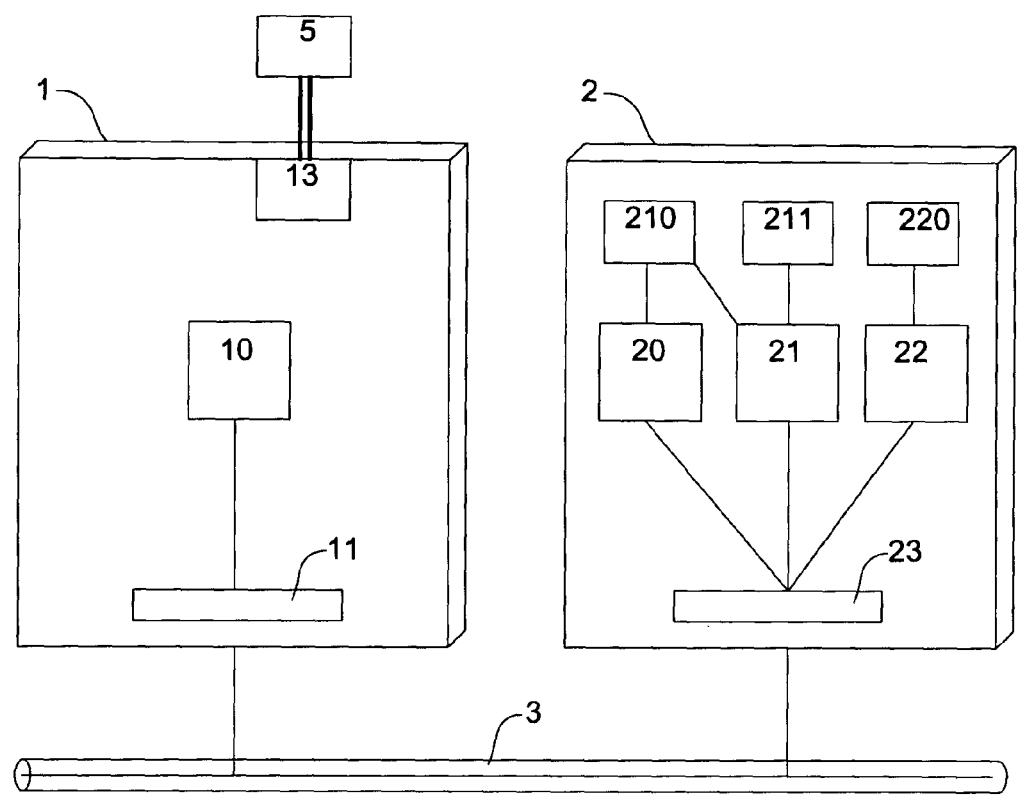
FIG. 1 represents a diagram of the device according to the invention.

The invention will now be described with reference to FIG. 1. An example of a jukebox 1 is described in the European patents EP 786 212 and EP 786 122 filed by the applicant. Such a jukebox 1 substantially comprises a means of payment, a viewing means associated with a means for interacting with the user, a sound playback means and a mass storage means for storing a plurality of musical selections. The jukebox 1 may also comprise a modem 13 or equivalent means for communicating with a remote server 5, e.g., for updating the library of musical selections.

In order to specify the context of the invention, it should be understood that the electronic game machines 2 are for instance electronic games or Internet access stations. Thus, the electronic game machines 2 do not originally provide functionalities such as that of jukebox or a jukebox terminal.

As a minimum, each electronic game machine 2 must originally comprise a viewing means 210, such as a video monitor, a means for interacting with a user 211, and its own means of payment 220. The interactive means 211 include for instance either a touch screen or a mouse-like pointer, or else push buttons or a keyboard.

The principle of the invention is that these electronic game machines 2 can be used as add-on selection means and means of payment for a jukebox 1, located nearby, in the same bar as the electronic game machines 2. Thus, each electronic game machine comprises a means for selecting between two operating modes. The first operating mode corresponds to the original operating mode of the electronic game machine, i.e. the machine is operating as an electronic game or an internet access station. In this mode and according to a first alternative embodiment, no communication is taking place between the jukebox 1 and the electronic game machine 2. In the second operating mode, the electronic game machine 2 is converted into an add-on selection means and a means of payment for the jukebox. In this mode, all the original functionalities are unused to allow for the selection and payment functions of the jukebox 2.

According to the invention, each electronic game machine 2 is fitted with a means 21 of connecting to a local communication network 3. The main feature of the local communication network 3 is that is must be bi-directional. Thus, the LAN 3 can be for instance of a radio frequency or of a wired type, or else it can use electric carrier currents. Preferably, in order to restrict installation costs, the connection means 21 will be chosen to be adaptable to an existing LAN. Also, the jukebox 1 furthermore comprises a means 11 of the same type for connecting to the local communication network 3.

Thus, via an appropriate communication protocol, the jukebox 1 can send and receive messages to and from each electronic game machine 2 through the local communication network 3. Management of the dialog with each electronic game machine 2 is provided by a special so-called dialog module 10 of the jukebox operating system.

The type of connection between the game machine 2 and the jukebox depends on the quantity of information to be transmitted to the game machine 2. The greater the quantity of information, the higher the throughput of the connection must be so as not to hinder the operation of the game machine 2.

Similarly, as a general rule, the type of connection between jukebox 1 and server 5 is different from the type of connection between game machine 2 and jukebox 1. Indeed, the communication between the jukebox and the server is rather of the long-range type when the connection between the game machines 2 and the jukebox 1 is rather of the LAN-type.

According to the invention, the interactive means 211 of each electronic game machine 2 comprises an activation means allowing switching of the operation of the electronic game machine 2 from a normal mode to the jukebox terminal mode, or vice versa. This activation means can consist, for instance, of a virtual button displayed on the monitor of the game machine 2 and onto which a pointing device (mouse cursor, or user's finger, or light pen) is moved for activating the functionality associated with the button. Also, each electronic game machine 2 comprises a means 20, 21, 22 of managing a viewing means 210, an interactive means 211 and a means of payment 220 to provide the operation of the electronic game machine 2 according to the second mode. Indeed, the second operating mode requires the viewing of specific selection screens as well as different management of the means of payment in comparison with the first operating mode of the electronic game machine 2.

These specific means are for instance software modules 20, 21, 22, e.g. loaded when the modification of the machine is installed and which belong to or are added to the operating system of each electronic game machine 2. The specific means also comprise an interface 23 communicating with the connection means comprising notification means so that each software module can transmit notifications or receive messages from the jukebox 1.

A first so-called supervisor module 20 comprises e.g., a first routine, respectively a second routine, that manages initialisation, respectively termination, of the operation of the electronic game machine 2 in the second operating mode, i.e. in the mode allowing the selection and payment for pieces of music from the jukebox 1.

Thus, when the game machine 2 is operating according to the first mode, a user selecting the activation means initiates the first routine of the supervisor module 20 which is then activated for initialising a second module 21, called the graphic management module. The graphic management module 21 is for managing the selection means 210 and the viewing means 211 of the electronic game machine 2. The supervisor module 20, via the first routine, initialises a third module 22 for managing the viewing of the means of payment 220 of the electronic game machine 2 according to the second mode.

The supervisor module 20 comprises a means for also initiating the sending of a message, via the notification means, through the LAN 3, to the jukebox 2, in order to notify the dialog module 10 of the jukebox 1 that the electronic game machine 2 has switched to the second mode. Upon receipt of this notification, the jukebox, via the dialog module 10, becomes the master of the dialog with the electronic game machine 2 and all the game functions of this machine are ignored. In response to this notification, the dialog module 10 comprises a means of sending messages to the graphic management module 21 which allows graphic user dialog screens to be displayed. These screens are for guiding the user when choosing songs and using the game machine 2 as the add-on selection means and means of payment of the jukebox.

Also, the interactions of the user with the selection means 210 of the game machine 2 are translated by the graphic management module 21 into messages that are then transmitted via the notification means to the dialog module 10 of the jukebox 1 to initiate the corresponding action, i.e. send the information allowing a screen display, to the machine 2 or validate a user choice.

According to the invention, the welcome screen sent and then displayed by the graphic management module 21 on the viewing means 211 of the electronic game machine 2 prompts the user to select a song from among the collection of songs available on the juke box. This welcome screen also includes a first display area containing the amount of money available to buy one or more credits. A credit represents the possibility of validating a musical selection to prompt its playback. Hence the amount available corresponds to a sum of money which has not been used by the user to pay for credits so as to purchase plays of songs or to pay for credits in order to be able to play a game on the game machine. A second display area contains the number of remaining credits to be used for the operating mode as a juke box terminal. The amount available is, for example, stored and administered by the management module 22 of the payment means of the came machine 2.

In an embodiment variant where the game machine 2 permits the user to accumulate points usable in the game machine 2 in order to obtain new game credits, the module for managing the payment means may include a sub-module that uses a rule for converting accumulated points into an available sum of money. Consequently, when the welcome screen is displayed calculation means of the module 22 for managing the payment means firstly converts accumulated points into an available sum of money called a virtual sum. Secondly, the calculation means of the module 22 of managing the payment means add this virtual available sum of money to the so-called real available sum of money corresponding to a real sum of money paid using the payment means of the game machine 2. The result of this addition, corresponding to the available sum of money displayed, is transmitted to the dialog module 10 of the juke box which then sends information permitting the display on the game machine 2 of the welcome screen comprising the display of the calculated available sum of money.

The welcome screen may also include a virtual button which when it is selected, triggers a payment procedure managed by the module 22 of managing payments and the graphic management module 21. This payment procedure firstly comprises the sending, by the dialog module 10 and then the display of a Payment screen by the module 21 of graphically managing the display means 211 of the electronic game machine 2. This payment screen includes a text area describing at least one rule of payment. By rule of payment one should understand a rule which defines the sum of money necessary to purchase a determined whole number of credits of musical selections. The module 22 for managing the means of payment checks the value of the sum available (possibly containing a real sum and a virtual sum as previously defined) and sends a notification to the dialog module 10 of the juke box containing the total sum of money available for the identified game machine 2. On reception of this notification, the juke box determines that they are the rules of payment authorized from among the list of available rules of payment and then sends the information that permits the display on the game machine 2 of the payment screen indicating, by a specific display, which are the authorized rules of payment in relation to the available sum of money. If no authorized and displayed rule of payment on the screen satisfies the user, that is to say if the amount available is insufficient to purchase the desired number of credits for musical selections, the user can then insert a sum of money or a means of payment in the game machine 2 in order to increase the amount available.

For each amount of money detected by the means of payment 220 of the game machine 2, the third management module 22 of the means of payment notifies the dialog module 10 via the notification means of the amount inserted into the electronic game machine 2 and modifies the value of the amount available. Upon receipt of the information corresponding to the amount received by the electronic game machine 2, the jukebox 2 determines the new value of the amount available and sends a message interpreted by the graphic module 21 in order to display a new payment screen in which new authorized rules of payment can be displayed, if the sum of money inserted permits.

The payment screen can include a virtual validation button, the selection of which causes either validation of the selected payment rule by the user from among the authorized payment rules and return to the welcome screen, or simply return to the welcome screen if no payment rule has been selected by the user. When a payment rule is validated, the calculation means of the module 22 for managing payment means calculates the new value of the amount available by deducting from the total available sum, the sum of money corresponding to the rule of payment selected by the user in order to acquire a certain number of credits. When the total available amount includes a virtual part and a real part, the calculation means use predetermined rules that define the proportions in which the virtual and real parts must be used in order to deduct the sum of money from the available amount. Hence, it may be previously defined by parameters that the virtual part is used up as a priority or that the virtual and real parts of the total available amount are used in an identical way.

The new available amount and the chosen payment rule are notified to the dialog module 10. On reception of this notification, the dialog module 10 sends a message interpreted by the graphic module 21 in order to display the welcome screen, possibly with the new available amount and the new number of credits for musical selections. The number of credits available is stored and updated, either on the game machine 2 or on the juke box. In the latter case, the value of the number of credits is associated with the identification of the corresponding game machine 2. In the case where the value of the number of credits is stored on the game machine 2, updating of the value of the number of credits available is carried out by sending a message from the dialog module 10 to the module 22 for managing payment of the game machine 2 indicating the new value of the number of credits. On reception of this message, the module 22 for managing payment carries out the update locally on the game machine 2.

In the case where the value of the number of credits is stored on the juke box, the value of the number of credits is increased locally on the juke box, on reception of notification indicating the payment rule selected after validation by the user.

In an embodiment variation, the modification of the amount available can occur at any time through insertion of a sum of money or of a means of payment into the game machine. In this variant, for each sum of money detected by the means 220 of payment of the game machine 2, the third module 22 for managing the payment means notifies the dialog module 10 by means of notification means, the amount inserted into the electronic game machine 2 and modifies the value of the amount available. On receipt of information corresponding to the amount received by the electronic game machine 2, the juke box 2 determines the new value of the amount available and sends a message interpreted by the graphic module 21 in order to modify the current screen in such a way that the displayed amount available corresponds to the calculated amount.

In an embodiment variant, it is possible that the minimum payment amount for the game machine 2 is greater than the minimum payment amount for the rules of payment off the juke box. By way of example, the minimum amount for the payment for a single selection is 1 franc while the minimum amount for the payment of one party on the game machine is 5 francs. Hence the case can occur that after selection of a payment rule, the remaining amount available is 3 francs and after using musical selection credits, the user swings over to the first operating mode corresponding to the original operating mode of the game machine 2. In this case, the module 22 managing the means of payment transfers an amount available which is not, a priori provided for permitting use of the game machine 2 in games mode. To remedy this situation, the means, for example the software, permitting operation according to the first mode are modified so that they take all the amounts into consideration. Another solution consists of displaying on the Payment screen only the rules of payment, for which the amount corresponds to a multiple of the minimum amount accepted by the game machine 2 in games mode. Finally, another solution consists of displaying on the payment screen only the rules of payment, selection of which ends up with either a reduction of the amount available to zero or reduction of the amount available to a value at least equal to the minimum payment amount for the game machine 2.

Selection of a musical work by the user is carried out by interactions with the welcome screen. As previously explained, the interactions of the user with the selection means 210 of the game machine 2 are translated by the graphic management module 21 into messages which are then transmitted by means of notification means 23 to the dialog module 10 of the juke box 1 to trigger the corresponding action, that is to say to send information permitting the display of a new screen on the machine or the modification of a screen.

When the user validates or confirms a musical selection made via a given action at the interactive means 210 of the electronic game machine 2, for example on a virtual validation button, the graphic management module 21 sends a notification to the dialog module 10 containing validation information and an identification of the selection. Upon receipt of this notification, the dialog module 10 then verifies the number of credits available. If the number of credits is different to zero, the dialog module 10 causes the activation of a jukebox 2 software module allowing insertion of the chosen selected work into a queue, with a view to playback thereof on the sound and video playback means of the jukebox 1, then deducts from the available credit balance an amount corresponding to the ordered selection. Finally the dialog module 10 sends a message which is interpreted by the graphic module 21 to allow the display of the welcome screen possibly with the amount of money available and the new number of credits for musical selections.

If the number of credits is equal to zero, the dialog module 10 sends a message interpreted by the graphic module 21 to display the payment screen previously described in such a way that validation of the selection is only confirmed if the user selects and validates a payment rule as described previously.

At any time, starting from the welcome screen, the user can actuate the activation means so as to switch the operating mode of the game machine 2 to the first operating mode corresponding to the original mode of the machine 2.

If the user selects the first operating mode by activating the activation means, the management module 21 initiates the notification means to send a notification of end of connection to the dialog module 10. Upon receipt of this notification, the dialog module 10 of the jukebox issues a termination message to the supervisor module 20 of the machine and switches the connection off. Upon of this message, the supervisor 20 activates the second routine causing the cancellation of the tasks to run by the graphic management module 21 and by the payment module 22 so as to activate again the original functions and tasks of the game machine 2. In the course of this shut down process, the module 22 for managing payment means transfers the total amount available, if it is different to zero, to a specific module for managing payments of the first operating mode. If the total available amount includes a residual virtual amount and a real amount, the calculation means of the module 22 for managing payment means, carries out the reverse conversion of the residual virtual amount into points and transfers the result of this conversion to a specific software module providing for operation of the game machine 2 according to the first mode. Similarly, the value of the number of credits usable for musical selections is stored, either in storage means of the game machine 2 by the module 22 for managing payment means, or in storage means of the juke box. In this latter case, the module 22 for managing payment means notifies, using notification means, the dialog module 10 of the juke box by indicating in a message, the value of the number of remaining credits and an identification of the game machine 2 issuing the notification. On receipt of this notification, the dialog module 10 stores the sent number of credits and links to it the identifier of the game machine 2 that issued it.

Finally, the selections made by the user and introduced into the queue with a view to playback thereof will be played back as if they had been chosen by using the user interface of the jukebox.

In an alternative embodiment, each electronic game machine 2 comprises an identification means in relation to the dialog module 10, so that, when the jukebox is connected to several came machines 2, can asynchronously manage the communication with the various game machines 2. If a single game machine is connected to the jukebox, the identification of the game machine 2 enables the operating system of the jukebox to simultaneously manage the selection operations at the game machine 2 and those performed at its own interactive means.

The contents of the screens displayed on the viewing means of each game machine 2 are dependent not only on the processing capacity of the viewing means of the game machine 2, but also on the maximum rate of data transfers authorized on the LAN. The higher the transfer rate, the better the display quality and quantity will be.

In another alternative embodiment, each electronic game machine 2 can comprise a statistics report module (not shown). This statistics report module includes collecting means for collecting information on the utilization of the game machine 2 when it is operating according to the first mode, i.e. according to its original operating mode. The information regarding the utilization of the game machine 2 is stored in the storage means of the machine 2, e.g. in a log file. The statistics report module includes a link with the notification means, so that the file or the statistical information contained in this log file is transmitted to the jukebox dialog module 10. The transmission of this information is initiated by the statistics report module, either at each connection of the game machine 2 on the LAN 3, or at regular intervals, or when the quantity of information to be transmitted reaches a determined threshold. When the dialog module 10 of the jukebox receives this information, it stores it in turn in its storage means in a be file. When the jukebox 1 logs on to a remote server 5, in order to update selection information or to send jukebox utilization data, the information regarding one or more game machines, contained in the jukebox log file can be transmitted on demand to the server to be used, e.g. for business purposes.

The utilization information of the game machine 2 is for instance the quantity of the amount of money entered into the game machine 2 when it is operating according to the first mode or, if the game machine 2 includes several games, the game most often chosen, or else other statistical information etc.

Also, the game machine 2 can contain an update management module enabling a remote server 5 to be used for updating the operating system of the game machine 2. For this purpose, the update information is first downloaded into the jukebox by announcing the identifier of the game machine 2 for which the update is meant. Then, the jukebox dialog module 10 can set up a connection with the update target game machine 2 in order to send the required information thereto. In another alternative embodiment, sending the update information is performed as soon as the game machine 2 notifies the dialog module 10 that it is connected.

Figure 2:
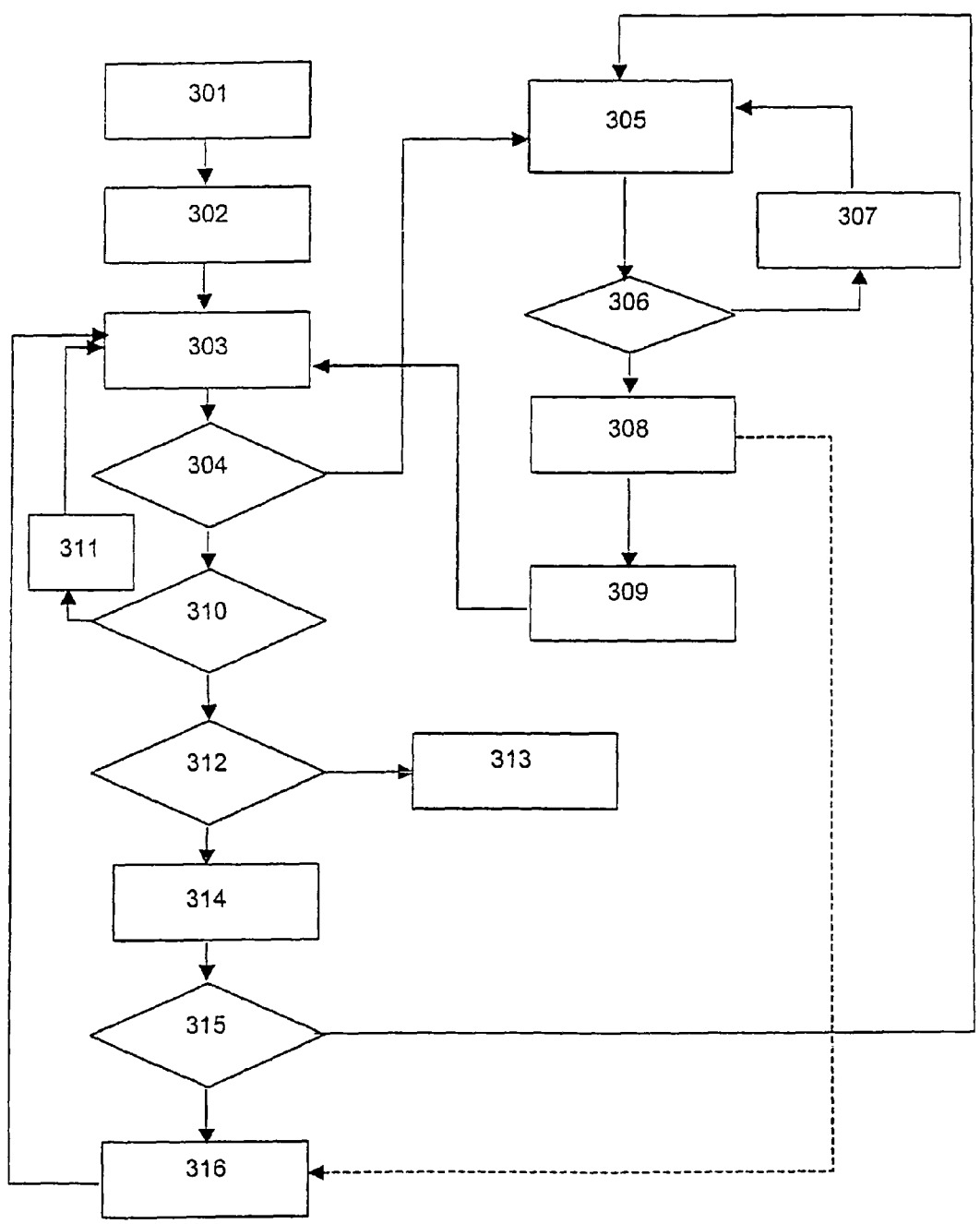
FIG. 2 represents a flow chart of the method according to the invention.

We are now going to describe the communication method according to the invention with reference to FIG. 2.

The first step 301 of the method according to the invention consists of operating the activation means to switch operation of the game machine into the second mode. This activation initiates, in a second step 302, a set up of the connection between a game machine 2 and jukebox 1. This setting up consists of activating the jukebox dialog module 10 and the graphic management 21 and payment 22 modules of the game machine. Next, in a third stet 303, a display made on the viewing means prompts a choice of a musical selection. The display step also comprises a step of collecting and/or calculating the amount of money available and possibly the remaining number of credits.

Several actions are possible on the part of the user. Consequently, the machine is standing by for a user interaction.

Hence, in a first case, the machine is waiting, in a fourth step 304, for the user to validate a payment procedure by acting on the interactive means of the game machine 2. If such is the case, a payment screen is displayed in a fifth step 305. As previously explained, this payment screen comprises the list of available payment rules. Next the machine waits, in a sixth step 306, for the user to insert a means of payment (coin, ticket, credit card etc.) The insertion of a means of payment causes, in a seventh step 307, a notification to be sent to the jukebox containing information representative of the detected amount. The jukebox responds to this notification by sending the game machine a message that permits modification of the payment screen in order to display, in accordance with the fifth step, the new amount available and possibly the new rules of payment available. As soon as the user inserts a means of payment, the seventh step and a return to the display 305 of the payment screen is carried out. In an eighth step 308, the machine 2 waits for the user to select a payment rule and/or a means of validation such as a virtual button on the payment screen in order to return to the welcome screen. If a payment rule is se before the selection of the means of validation, in a ninth step 309 the graphic management module 21 sends, to the dialog module 10, a notification representative of the payment rule selected by the user. In this ninth step 309, and on receipt of this notification, the dialog module 10 increases the number of credits and reduces the amount available and then sends a message to the graphic module in order to display, in accordance with the third step 303, the welcome screen with the new credit values and the amount available. If no payment rule is selected, before the selection of the means of validation, the graphic management module 21 notifies it to the dialog module 10, by indicating to it that no payment rule has been selected. On receipt of this notification, the module again carries out the third step 303 of displaying the welcome screen.

If triggering of the payment procedure, as previously defined, is not carried out, while the welcome screen is displayed, in a tenth step 310, the machine waits for insertion of a means of payment. If a sum of money is inserted into the machine 2, in an eleventh step 311, a notification generated by the module 22 managing the payment means and containing information representative of the amount detected, is sent to the dialog module 10 of the juke box. The dialog module 10 of the juke box responds, in the eleventh step 311, to this notification by sending to the game machine, a message permitting modification of the welcome screen to display, in accordance with the third step 303, the new amount available.

If no sum of money is detected, during display of the welcome screen in the third step 303, the machine awaits, in a twelfth step 312, activation of the activation means in order to switch the operation of the game machine from the second mode (juke box interface mode) to the first mode (original mode of the game machine). If this activation is detected, a thirteenth step 313 is triggered in which the tasks specific to the choice and to the payment for the selections on the game machine are closed by the dialog module and the connection between the juke box and the game machine 2 is broken. The thirteenth step also comprises the transfer, by the module 22 for managing the payment means, to the specific means of the game machine, of the remaining amount available and unused at the time of switching over to first mode.

During display of the third step 303, the user may, in a fourteenth step 314 use the interactive means to choose a musical selection. When the selection made has been validated by the user, the graphic management module 21 notifies the dialog module 10 of information representing the identification of the selection made. Upon receipt of this notification, in a fifteenth step 315, the dialog module 10 checks whether the credit balance is equal to zero.

If the credit balance is zero, the method according to the invention triggers the payment procedure through a fifth step 305. The procedure is identical, except for the fact that after the eighth step 308 of the payment procedure, the dialog module 10 is notified by the module 22 for managing payment means in order, in a sixteenth step 316, to insert the selection made and validated, into a queue of selections to be played back, and in order to deduct a credit from the total number of credits. Next, the dialog module 10 sends a message causing a return to the third step 303 of displaying the welcome screen with an update of the number of credits.

If, in the fifteenth step 315, the credit balance is different from zero, the dialog module 10, in the sixteenth step 316, inserts the chosen and validated selection into a queue of selections to be played back and deducts a credit from the total number of credits. Next, the dialog module 10 sends a message causing a return to the third step 303 of displaying the welcome screen with an update of the number of credits.

Thus, the communication device according to the invention is characterized in that each electronic game machine 2 is connected to the playback system 2 via a network interface 23 and an associated LAN 3 and comprises specific means 22, for managing the means of payment, specific means 21 for managing the viewing means, and the interactive means, in order to enable, on the electronic game machine 2, the selection of and payment for at least one selection stored on the playback system 2 with a view to playback thereof on the playback system, the specific means 22 of managing the payment means and the specific means 21 of managing the viewing means and the interactive means being triggered by the activation means of the electronic game machine 2.

In another embodiment, the playback system 2 comprises a means 11 communicating with the communication interface 23 of each electronic game machine 2, a specific module 10 for managing messages coming from each electronic game machine 2.

In another embodiment, each electronic game machine 2 comprises identification means enabling differentiation at the playback system 2.

In another embodiment, the playback system 2 comprises a means 13 communicating with a remote centralized server 5.

In another embodiment, each electronic game machine 2 comprises a storage means allowing to store information regarding the utilization of the electronic game machine.

In another embodiment, the specific means 22 of managing the payment means comprise means of calculating the amount available to pay for the songs, firstly from a sum of money inserted by the user into the electronic game machine 2, secondly from a remaining amount of money inserted into the game machine 2 before triggering of the specific means 20, 21, 22 of management and thirdly from a number of game points accumulated before triggering of the specific management means 20, 21, 22.

Also, the communication method is characterized in that it comprises the steps of:

activating 301 specific management means of an electronic game machine 2 so as to change the original operating mode of the electronic game machine 2 into a mode implementing the following steps of:

setting up a connection 302 between the playback system and the electronic, game machine;

transferring 303, 304 graphic dialog screens, from the playback system to the electronic game machine 2, prompting a user to make a musical selection or to trigger a payment step;

choosing 308 a musical selection paying for 315 the chosen selection playing back the chosen selection through the playback system 1.

In another embodiment, the payment step comprises:
a step of calculating the amount available from the remaining amount unused by the game machine and the sum of money inserted into the payment means of the game machine, by the user,
a step of selection and validation by the user of a payment rule to determine the number of selections to be chosen.

In another embodiment, the calculation step comprises a step of converting a number of game points accumulated during use of the game machine, in accordance with its original operation, into an amount available.

In another embodiment, the method includes a step of updating at least one electronic game machine 2 comprising the steps of:
   transferring, from a remote server 5, update information regarding at least one given electronic game machine 2, onto the playback system connected to the server via a WAN;
   setting up a connection between the playback system and each given electronic game machine 2,
   sending update information on each given electronic game machine 2.

In another embodiment, the method includes the steps of:
   storing on each electronic game machine 2 information concerning utilization thereof,
   transferring information regarding the utilization of the electronic game machines 2 to the playback system, then from the playback system to a remote server 5 whereto the playback system is connected via a WAN.

In another embodiment, the step of making a selection is followed by a step of reducing the credit and the two steps are iterated until the credit is used up.

It should be obvious for people skilled in the art that the invention allows for embodiments of numerous other specific forms without departing from the field of application of the invention as claimed. Consequently, the present embodiments are to be considered by way of example, but can be modified within the field defined by the scope of the appended claims. In particular, the description made with reference to the selection of a song may equally well be applied to the selection of a work other than a musical work, for example a film, text of a novel or any other audio-visual work.

The invention claimed is:

1. A system for providing communications between an electronic jukebox and at least one electronic game machine, comprising:
   a communications interface configured to facilitate interactions between the electronic jukebox and at least one electronic game machine located remote from the electronic jukebox;
   wherein the at least one electronic game machine is operable to select at least one selection stored on the electronic jukebox for playback on the electronic jukebox,
   wherein the at least one electronic game machine is configured to receive payment in connection with the playback of the at least one selection, and
   wherein the at least one electronic game machine is configured to communicate with the electronic jukebox to play the at least one selection via the communications interface to initiate playback of the at least one selection.

2. The system according to claim 1, wherein the electronic jukebox comprises a module for managing messages coming from each electronic game machine via the communications interface.

3. The system according to claim 1, wherein each said electronic game machine comprises an identification module that enables an electronic jukebox with which electronic game machine is communicating to differentiate between the electronic game machines in communication with the electronic jukebox.

4. The system according to claim 1, wherein the electronic jukebox is operable to communicate with a remote centralized server.

5. The system according to claim 1, wherein each electronic game machine comprises a storage location for storing information regarding utilization of the electronic game machine.

6. The system according to claim 1, wherein a payment management module is operable to calculate an amount available to pay for songs from at least one of: a sum of money inserted by the user into the electronic game machine, from a residual sum of money inserted into the game machine before triggering of the payment management module, and from a number of points accumulated before triggering the activation circuit.

7. A method of communicating between an electronic jukebox and at least one electronic game machine located remote from the electronic jukebox, the method comprising:
   establishing a connection between the electronic jukebox and the at least one electronic game machine via a communications interface therebetween;
   prompting a user using the at least one electronic game machine to make a musical selection such that the at least one electronic game machine functions as an interface to the electronic jukebox;
   receiving input corresponding to the musical selection;
   prompting a user using the at least one electronic game machine to insert payment to initiate playback of the musical selection;
   receiving payment for the musical selection made; and
   sending an instruction to the electronic jukebox to play back the selection on the electronic jukebox.

8. The method according to claim 7, further comprising:
   upon receiving payment, calculating an amount available from a remaining amount unused by the game machine and a sum of money inserted into a payment module of the game machine by the user; and
   calculating a maximum number of selections that may be made based on a payment rule.

9. The method of communication according to claim 8, wherein the calculating comprises converting a number of game points accumulated during use of the game machine in accordance with an original operation mode of the game machine, into the amount available for paying for the musical selection.

10. The method of communication according to claim 7 further comprising updating said at least one electronic game machine, the updating comprising:
   transferring update information for the at least one electronic game machine from a remote server onto the electronic jukebox connected to the server;
   setting up a connection between the electronic jukebox and the at least one electronic game machine; and
   sending said update information to the at least one electronic game machine to cause an update thereof.

11. The method of communication according to claim 7 further comprising:
   storing on each said electronic game machine information relating to utilization of the at least one electronic game machine; and
   transferring information regarding the utilization of the at least one electronic game machines to the electronic jukebox, then from the electronic jukebox to a remote server.

12. A method of communicating between an electronic jukebox and at least one electronic game machine located remote from the electronic jukebox, the method comprising:

establishing a connection between the electronic jukebox and the at least one electronic game machine via a communications interface therebetween; and receiving an instruction on the electronic jukebox from the at least one electronic game machine to play back the selection on the electronic jukebox following user manipulation of the at least one electronic game machine, the manipulation including a user selection of at least one instance of media for playback from and on the electronic jukebox and payment for the user selection.

* * * * *